US 008827375B2

(12) United States Patent  (10) Patent No.: US 8,827,375 B2
Takenaka et al.  (45) Date of Patent: Sep. 9, 2014

(54) WHEEL, AND FRICTION DRIVE DEVICE AND OMNI-DIRECTIONAL VEHICLE USING THE SAME

(75) Inventors: Toru Takenaka, Saitama (JP); Makoto Hirano, Saitama (JP); Hideharu Izumi, Saitama (JP); Kazuya Kuwabara, Saitama (JP); Taiji Koyama, Saitama (JP); Masao Sasaki, Saitama (JP); Hiroshi Gomi, Saitama (JP); Shinichiro Kobashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 495 days.

(21) Appl. No.: 13/132,681

(22) PCT Filed: Dec. 1, 2009

(86) PCT No.: PCT/JP2009/006512
§ 371 (c)(1),
(2), (4) Date: Jun. 3, 2011

(87) PCT Pub. No.: WO2010/064408
PCT Pub. Date: Jun. 10, 2010

(65) Prior Publication Data
US 2011/0233989 A1  Sep. 29, 2011

(30) Foreign Application Priority Data
Dec. 5, 2008  (JP) .................. 2008-311268

(51) Int. Cl.
*B60B 19/12* (2006.01)
*B60B 19/00* (2006.01)
*B62M 6/70* (2010.01)
*B62K 1/00* (2006.01)
*B62M 6/40* (2010.01)

(52) U.S. Cl.
CPC ............... *B62M 6/70* (2013.01); *B60B 19/003* (2013.01); *B60B 2900/131* (2013.01); *B60B 2360/32* (2013.01); *B60B 2200/47* (2013.01); *B60B 2360/10* (2013.01); *B60B 19/125* (2013.01); *B62K 1/00* (2013.01); *B60B 2360/1444* (2013.01); *B60B 2360/1434* (2013.01); *B62M 6/40* (2013.01); *B60Y 2200/40* (2013.01); *B60B 2360/348* (2013.01); *B60B 2900/211* (2013.01); *B60B 2900/133* (2013.01)
USPC ....................................... 301/5.23

(58) Field of Classification Search
USPC ......... 301/5.1, 5.7, 5.23; 16/18 R, 45, 46, 47, 16/35 R; 280/250.1; 188/19, 20, 68, 69
See application file for complete search history.

(56) References Cited

U.S. PATENT DOCUMENTS

| 5,312,165 | A  | * | 5/1994 | Spletter ........................ 301/5.23 |
| 7,552,977 | B2 | * | 6/2009 | Lamprich et al. ............ 301/5.23 |
| 7,641,288 | B1 | * | 1/2010 | Baker et al. .................. 301/5.23 |
| 2010/0096905 | A1 | * | 4/2010 | Takenaka et al. ............ 301/5.23 |

FOREIGN PATENT DOCUMENTS

| JP | 59-109402 A | 6/1984 |
| JP | 10-129517 A | 5/1998 |
| JP | 3421290 B2 | 6/2003 |
| JP | 3820239 B2 | 9/2006 |
| WO | 2008/139740 A1 | 11/2008 |

* cited by examiner

Primary Examiner — S. Joseph Morano
Assistant Examiner — Jean Charleston
(74) Attorney, Agent, or Firm — Carrier Blackman & Associates, P.C.; Joseph P. Carrier; Jeffrey T. Gedeon

(57) ABSTRACT

In a wheel for use in an omni-directional vehicle, gravel and other foreign matters are prevented from being trapped between free rollers forming the wheel, and traveling vibrations and noises are minimized at the same time. The wheel includes an annular member and a plurality of free rollers each rotatably supported by the annular member around a corresponding tangential line of the annular member, and a gap member is placed between each adjacent pair of the free rollers to fill a gap defined between the free rollers.

8 Claims, 9 Drawing Sheets

WHEEL, AND FRICTION DRIVE DEVICE AND OMNI-DIRECTIONAL VEHICLE USING THE SAME

TECHNICAL FIELD

The present invention relates to a wheel, and a friction drive device and an omni-directional vehicle using the same, and in particular to an omni-wheel, and a friction drive device and an omni-directional vehicle using the same.

BACKGROUND OF THE INVENTION

A friction drive device for an omni-directional vehicle that can freely move about on a floor is known. This device comprises a main wheel including an endless annular member and a plurality of free rollers rotatably supported along the outer circumference of the annular member, and a plurality of drive rollers engaging the outer circumferential surfaces of the free rollers at the outer circumferential surfaces thereof so that the rotation of the drive rollers may be frictionally transmitted to the free rollers. See the third embodiment illustrated in FIGS. 17 and 18 of Japanese patent publication No. 3820239B, for instance.

Also is known a wheel for an omni-directional vehicle including two kinds of barrel-shaped free rollers having large and small diameters arranged along the periphery of the wheel in an alternating fashion. Each large diameter barrel-shaped free roller is provided with a recess in which the bearing and a part of the adjacent small diameter barrel-shaped free roller is received, and the curvatures of the two kinds of free rollers are selected such that the overall profile of the barrel-shaped free rollers, and hence the overall profile of the wheel may be highly close to a true circle. See Japanese patent publication No. 3421290B, for instance.

BRIEF SUMMARY OF THE INVENTION

Task to be Achieved by the Invention

In the wheels of the friction drive devices mentioned above, wedge shaped gaps are created between adjacent free rollers (or on axial ends thereof), and foreign matters such as gravel could be trapped in such gaps while the wheel travels over a road surface. Should such a foreign matter is trapped in any of the gaps, the free rollers are prevented from rotating around the respective axial lines, and this prevents the vehicle actuated by the friction drive deice from cornering or traveling obliquely as designed.

Also, the gaps between adjacent free rollers cause irregularities in the outer profile of the wheel (with respect to a circular profile centered around the central axial line of the wheel), and this may cause rattling or other vibrations and noises as the wheel rotates around the central axial line thereof, and rolls over the road surface.

In view of such problems of the prior art, a primary object of the present invention is to provide a friction drive device that can avoid intrusion of gravel and other foreign matters into gaps between the free rollers, and minimize the vibrations and noises when the wheel rolls over the road surface.

Means to Achieve the Task

The wheel of the present invention comprises a wheel including an annular member and a plurality of free rollers each rotatably supported by the annular member around a corresponding tangential line of the annular member, and is characterized by that a gap member is placed between an adjacent pair of the free rollers to fill a gap defined between the free rollers.

The gap member is required not to obstruct the rotation of the free rollers. The gap member may be given with a wedge shape tapering toward a central axial line of the wheel, and configured to be moveable in a same direction as a rotational movement of the free rollers at least in a part of the gap member facing a road surface. The gap member may also be given with a wedge shape complementary to the gap defined between the free rollers, and secured to the annular member in a rotational fast manner. Alternatively, the gap member may include a plurality of vane members extending radially from the annular member like a brush.

The friction drive device of the present invention may comprise a wheel as defined above, a pair of rotatable members rotatably supported on either side of the wheel around a central axial line of the annular member; and a plurality of drive rollers arranged on each rotatable member along a circle concentric to a rotational center of the rotatable member such that each drive roller is rotatable around a rotational center line in a skewed relationship to the rotational center line of the rotatable member, and engages an outer circumferential surface of the corresponding free roller.

The friction drive device of the present invention may also comprise a wheel as defined above, a wheel supporting rotatable member rotatably supported on one side of the wheel around a central axial line of the annular member and supporting the annular member of the wheel, a rotatable member rotatably supported on another side of the wheel around the central axial line of the annular member, and a plurality of drive rollers arranged on each rotatable member along a circle concentric to a rotational center of the rotatable member such that each drive roller is rotatable around a rotational center line in a skewed relationship to the rotational center line of the rotatable member, and engages an outer circumferential surface of the corresponding free roller.

The omni-directional vehicle of the present invention includes a friction drive device as defined above, and is configured to travel by a wheel as defined above.

Effect of the Invention

In the wheel of the present invention, the gap member fills the gap between the adjacent free rollers, and prevents any foreign matter from being trapped in the gap. Also, as the irregularities in the outer profile of the wheel are reduced, vibrations and noises that are generated as the wheel rolls over the road surface can be minimized.

DETAILED DESCRIPTION OF THE PREFERRED EMBODIMENT(S)

Referring to FIGS. 1 to 4, a friction drive device embodying the present invention and an omni-directional vehicle 1 using the same are described in the following.

Figure 1:
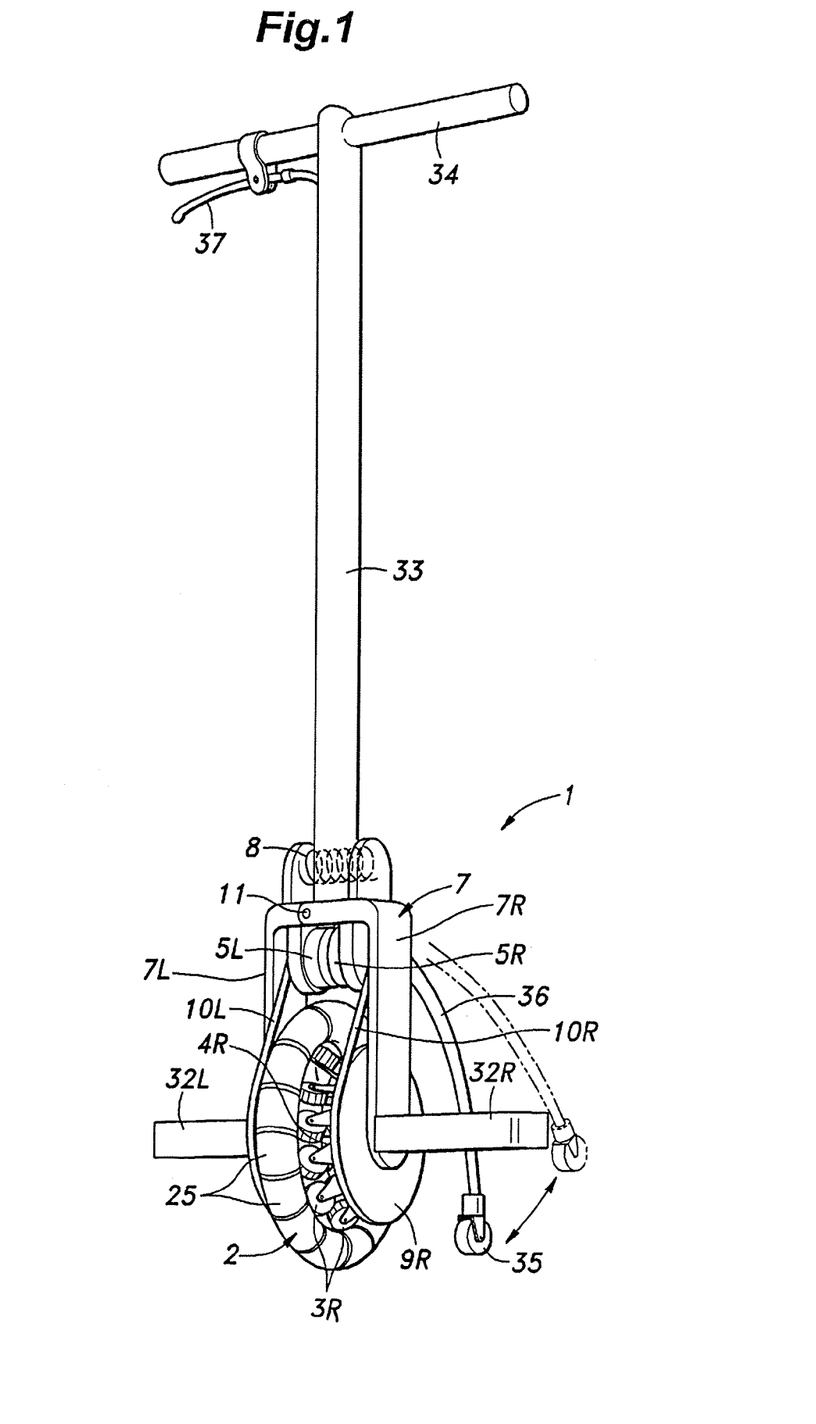
FIG. 1 is a perspective view of a wheel, and a friction drive device and an omni-directional vehicle using the same given as a first embodiment of the present invention.
Figure 2:
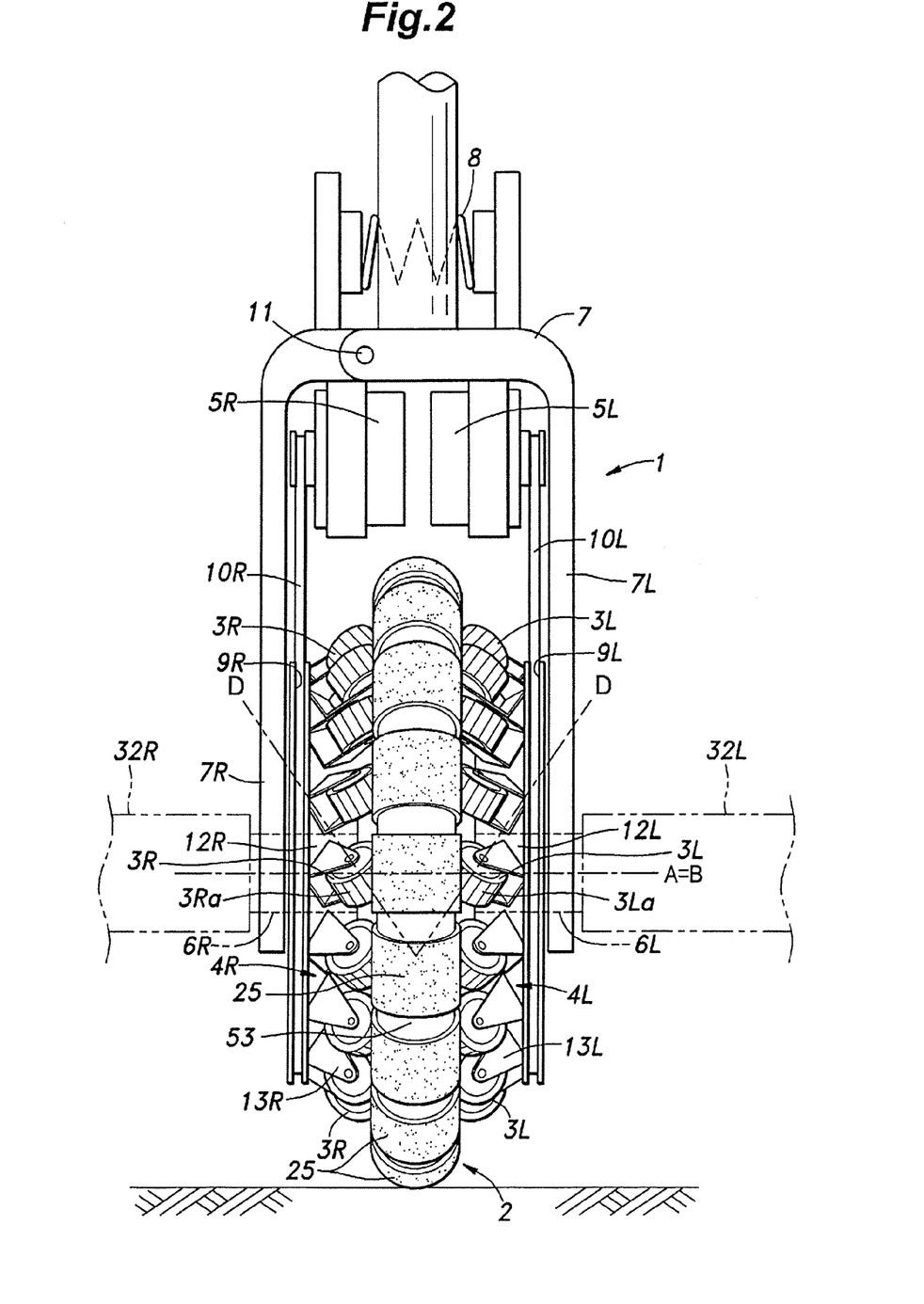
FIG. 2 is an enlarged front view of the wheel, and the friction drive device and omni-directional vehicle using the same of the first embodiment.

As shown in FIGS. 1 and 2, the omni-directional vehicle 1 of the illustrated embodiment comprises a lower vehicle body 7 of a yoke configuration that supports, although in an indirect manner, a main wheel (road wheel) 2 in a rotatable manner.

The lower vehicle body 7 includes a pair of leg members 7R and 7L that are hinged to each other via a hinge pin 11. Each leg member 7R, 7L is provided with a step 32R, 32L extending substantially in the horizontal direction. To the left leg member 7L is affixed a lower end of a pole 33 which extends vertically upward and provided with a horizontally extending handle bar 34 at the upper end thereof. A compression coil spring 8 is interposed between the right and left leg members 7R and 7L of the lower vehicle body 7 so that the two leg members 7R and 7L are resiliently urged toward each other.

The lower vehicle body 7, two steps 32R and 32L, pole 33 and handle bar 34 are integrally joined to each other, and jointly form a vehicle body of the omni-directional vehicle 1.

The lower vehicle body 7 is fitted with an auxiliary wheel 35 via an arm 36 having an upper end pivotally supported by a rear part of the of the lower vehicle body 7 so as to be raised and lowered as required. The auxiliary wheel 35 is supported by the free end (lower end) of the arm 36 so as to be located behind the main wheel 2 and rotatable around a horizontal axial line. The handle bar 34 is provided with a grip lever 37 that is connected to the arm 36 via a per se known Bowden cable (not shown in the drawings) so that the arm 36 may be raised by squeezing the grip lever 37 by hand.

A right rotatable member 4R is rotatably supported by the right leg member 7R via a support shaft 6R, and a left rotatable member 4L is rotatably supported by the left leg member 7L via a support shaft 6L so that the right and left rotatable members 4R and 4L are supported by the vehicle body 7 so as to be rotatable around a common central axial line (A) in an axially spaced apart relationship.

Each rotatable member 4R, 4L is integrally and coaxially provided with a pulley (or sprocket) 9R, 9L. Each leg member 7R, 7L is provided with an electric motor 5R, 5L in such a manner that each rotatable member 4R, 4L is rotatively actuated around the central axial line (A) of the support shaft 6R, 6L by drivingly connecting the output end of the corresponding electric motor 5R, 5L with the corresponding pulley 9R, 9L via an endless belt (or link chain) 10R, 10L. Thereby, the two rotatable members 4R and 4L can be individually actuated by the corresponding electric motors 5R and 5L.

The vehicle body 7 and/or the pole 33 are incorporated with a rechargeable battery for powering the electric motors 5R and 5L and a control unit for the inverted pendulum control and travel control of the omni-directional vehicle 1 which are not shown in the drawings.

Each rotatable member 4R, 4L is formed with a frusto-conical tapered outer circumferential surface 12R, 12L opposing the other rotatable member. To the frusto-conical tapered outer circumferential surface 12R of the right rotatable member 4R are mounted a plurality of drive rollers (second free rollers) 3R which are arranged circumferentially or along the direction of the movement of the right rotatable member 4R, each via a bracket 13R and a pivot pin 14R, at a regular angular interval. To the frusto-conical tapered outer circumferential surface 12L of the left rotatable member 4L are likewise mounted a plurality of drive rollers (second free rollers) 3L which are arranged circumferentially or along the direction of the movement of the left rotatable member 4L, each via a bracket 13L and a pivot pin 14L, at a regular angular interval.

The main wheel 2 is located between the right and left rotatable members 4R and 4L, and is rotatably supported around a central axial line (B) (axis of symmetry) coaxial with the central axial line (A) of the right and left rotatable members 4R and 4L by being interposed between the right drive rollers 3R of the right rotatable member 4R and left drive rollers 3L of the left rotatable member 4L.

The main wheel 2 is interposed between the right and left rotatable members 4R and 4L, and is rotatably supported by being held between the right drive rollers 3R of the right rotatable member 4R and left drive rollers 3L of the left rotatable member 4L around the central axial line (B) (axis of symmetry) coaxial with the central axial line (A) of the right and left rotatable members 4R and 4L. In other words, the right and left rotatable members 4R and 4L are rotatably supported on either side of the main wheel 2 around an axial center line coaxial with the axial center line of the main wheel 2.

The main wheel 2 comprises an annular member 22, a plurality of free rollers (first free rollers) 25 rotatably supported thereby so as to be rotatable around an axial line tangential to the corresponding point of the annular member 22, and gap members 53.

Figure 3:
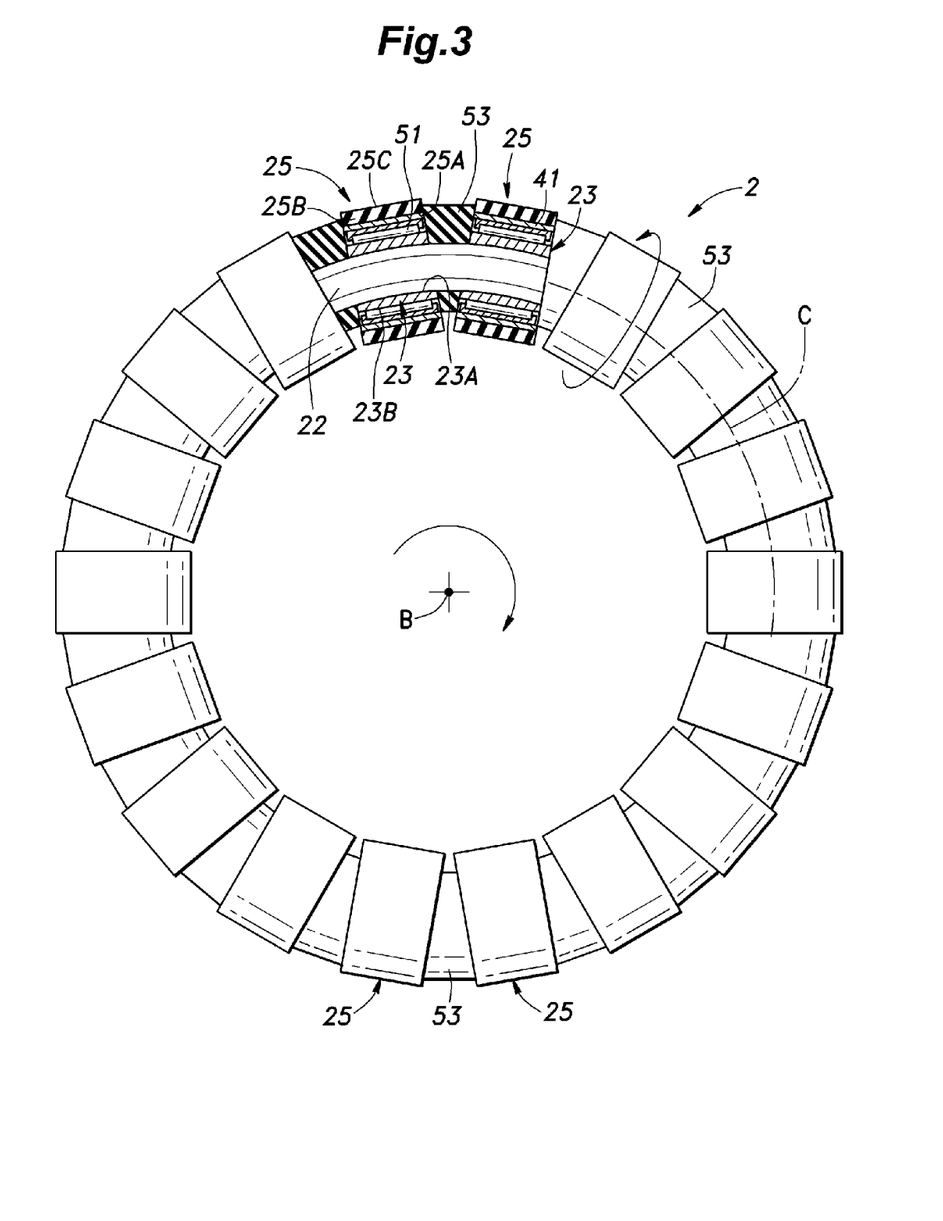
FIG. 3 is an enlarged sectional view of the main wheel of the first embodiment.

More specifically, as shown in FIG. 3, the annular member 22 is formed by a metallic rod having a hexagonal cross section. A plurality of inner sleeves 23 each having a hexagonal bore 23A curved at a same curvature as the annular member 22, and complementary in cross section with the annular member 22 are fitted onto the annular member 22 so as to be rotatively and circumfenetically immobile relative to the annular member 22. The outer circumferential surface 23B of each inner sleeve 23 defines a true cylindrical surface. The annular member 22 may consist of a polygonal ring or a combination of arcuate segments.

Each free roller 25 comprises a metallic cylindrical sleeve 25A and a cylindrical outer peripheral member 25B fixedly fitted on the inner sleeve 25A and defining an outer circumferential surface 25C of the free roller 25. The outer peripheral member 25B s made of rubber-like elastomeric material. The inner circumferential surface of each free roller 25 is rotatably fitted on the outer circumferential surface 23B of the corresponding inner sleeve 23 via a needle bearing 51.

Each free roller 25 is configured to engage an object to which a drive force is to be transmitted or applied, and is fitted around the annular member 22 like beads of a rosary. More specifically, each free roller 25 is rotatable around the tangential direction of the annular member 22 or the cross sectional center line (C) of the annular member 22. In other words, each free roller 25 is rotatable around the axial center line thereof, and this rotational movement may be compared to a rotation of a planet around the rotation axis thereof.

The outer circumferential surface of each drive roller 3R, 3L engages the outer circumferential surface 25C of the corresponding free roller 25 under the biasing force of the compression coil spring 8, and power is frictionally transmitted from the drive rollers 3R and 3L to the free rollers 25. In other words, the outer circumferential surface of each drive roller 3R, 3L engages the outer circumferential surface 25C of the corresponding free roller 25 in a torque transmitting relationship so that the rotation of the rotatable members 4R and 4L is transmitted to the main wheel 2.

The number of the drive rollers 3R, 3L on each rotatable member 4R, 4L in relation with the number of the free rollers 25 is selected in such a manner that the free roller 25 engaging the floor surface or road surface is engaged by at least one of the drive rollers 3R, 3L, and thereby receives a drive force at all times.

In this case, the cross sectional center line of the main wheel 2 is defined by connecting the central axial lines of the free rollers 25 into a ring, and the rotation of the main wheel 2 around the cross sectional center line (C) is given by the rotation of each free roller 25 around the central axial line thereof.

Figure 4:
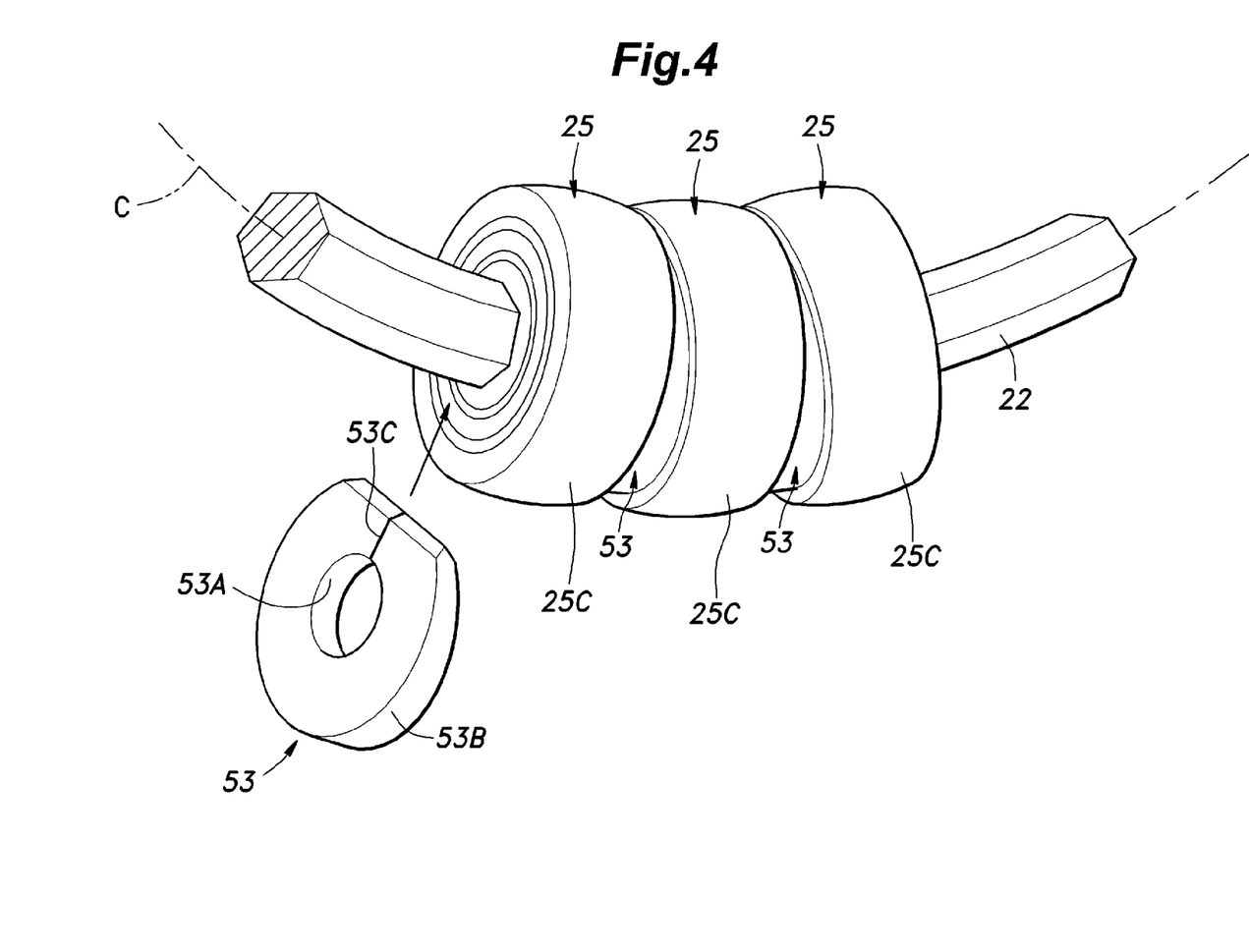
FIG. 4 is an enlarged fragmentary perspective view of the main wheel of the first embodiment.

Between each adjacent pair of free rollers 25 is inserted a gap member 53 having a wedge shape tapering toward the central axial line of the main wheel 2. Preferably, as shown in FIG. 4, the wedge shape of each gap member 53 is substantially complementary to the shape of the gap between the adjacent free rollers 25. Each gap member 53 is provided with a circular central bore 53A that circumscribes the hexagonal cross section of the annular member 22, and defines an outer circumferential surface (ground contact surface) 53B that is substantially coaxial with the outer circumferential surfaces of the adjoining free rollers 25 and has an outer diameter equal to or slightly smaller than that of the free rollers 25. The gap member 53 may be made of material such as plastic, rubber-like elastomer, elastomer and foamed material.

On an imaginary plane perpendicular to the central axial line (B) of the main wheel 2, or as seen in FIG. 3, each gap member 53 tapers toward the central axial line (B), and is rotatably fitted on the outer circumferential surface of the annular member 22 by the circular bore 53A so as to be rotatable. In other words, each gap member 53 is supported by the annular member 22 so as to be rotatable around the cross sectional center line (C) thereof, and substantially entirely fills the gap between the adjacent free rollers 25.

In particular, the outer circumferential surface 53B of each gap member 53 that could engage the road surface is rotatable in the same direction as the adjacent free rollers 25. In the case where the main wheel 2 engages the outer circumferential surface of a ball to cause the ball to roll, the outer circumferential surface 53B of each gap member 53 could engage the outer circumferential surface of the ball.

By thus filling the gap between each adjacent pair of free rollers 25 with the gap member 53, the irregularities of the circumferential contour centered around the central axial line (B) can be reduced or can even be eliminated.

Each gap member 53 is linearly cut off at the side having the least thickness (inner peripheral side of the main wheel 2) into the shape of letter-D in front view to avoid interference with the free rollers 25. The part of each gap member 53 having the least thickness is also provided with a slit 53C so that the gap member 53 may be replaceably fitted on the annular member 22 by pushing the two parts of the gap member 53 adjoining the slit 53C away from each other in the thickness-wise direction of the gap member 53.

The outer circumferential surface 3Ra, 3La of each drive roller 3R, 3L engages the outer circumferential surface 25C of the corresponding free roller 25 under the biasing force of the compression coil spring 8 so that rotative force (propelling force) is frictionally transmitted from the drive rollers 3R and 3L to the free rollers 25. In other words, the outer circumferential surface 3Ra, 3La of each drive roller 3R, 3L engages the outer circumferential surface 25C of the corresponding free roller 25 in a torque transmitting relationship so that the rotation of the rotatable members 4R and 4L is transmitted to the main wheel 2.

Each of the drive rollers 3R and 3L is supported so as to be rotatable around a central axial line (D) which is neither perpendicular nor parallel to the rotational direction of the main wheel 2 around the central axial line (B) (which is the same as the central axial line (A) of the rotatable members 4R and 4L) or, more accurately, the tangential direction of the circle centered around the central axial line (B) at the point corresponding to the point of contact. In other words, each of the drive rollers 3R, 3L has a central axial line (D) which is tilted with respect to the rotational direction of the main wheel 2 around the central axial line (B), and is in a skewed relationship to the central axial line (A) of each rotatable member 4R, 4L.

When seen in a projected plane perpendicular to the central axial line (A), the central axial line of each drive roller 3R, 3L tilts by a certain angle with respect to the central axial line of the corresponding free roller 25. The central axial line of each drive roller 3R, 3L tilts with respect to the radial line of the annular member 22 corresponding to the center of the corresponding free roller 25, and, at the same time, tilts with respect to an imaginary plane tangential to the cross sectional central line of the annular member 22. This three dimensional tilting of the two axial lines is similar to the tilting of the teeth of a pair of helical conical gears meshing with each other.

Owing to this geometrical relationship, the right and left drive rollers 3R and 3L transmit the rotation of the rotatable members 4R and 4L as a side force to the free rollers 25 via the frictional engagement between the outer circumferential surfaces of the drive rollers 3R and 3L and free rollers 25.

Owing to the engagement between the right and left drive rollers 3R and 3L that rotate with the respective rotatable members 4R and 4L and the free rollers 25, the main wheel 2 of the illustrated embodiment is able to apply a lateral drive force to the road surface by causing the free rollers 25 to rotate around the cross sectional center line (C) of the annular member 22, and to apply a fore-and-aft drive force to the road surface by causing the main wheel 2 to rotate around the central axial line (B) thereof (or causing the free rollers 25 to move circumferentially around the central axial line (B) of the main wheel 2).

When the rotatable members 4R and 4L rotate in the same direction at the same rotational speed powered by the corresponding electric motors 5R and 5L, the drive rollers 3R and 3L turn around the central axial line (A) of the rotatable members 4R and 4L without each drive roller 3R, 3L rotating around the central axial line thereof, and the resulting side force of each drive roller 3R, 3L includes a component that actuates each free roller 25 of the main wheel 2 along the cross sectional center line thereof (tangential direction). Thereby, the main wheel 2 rotates around the central axial line (B) without each free roller 25 rotating around the central axial line (C) thereof.

If the rotatable members 4R and 4L are made to rotate in opposite directions and/or at different speeds powered by the corresponding electric motors 5R and 5L, the drive rollers 3R and 3L turn around the central axial line (A) of the rotatable members 4R and 4L while each drive roller 3R, 3L rotates around the central axial line thereof, and the resulting side force of each drive roller 3R, 3L includes a component that actuates each free roller 25 of the main wheel 2 along the outer circumference of the free roller 25 or around the axial center line thereof. Thereby, the free roller 25 rotates around the cross sectional center line (C) or tangential line.

The rotation of each free roller 25 around the cross sectional center line (C) thereof or the tangential line depends on the difference between the rotational speeds of the two rotatable members 4R and 4L. For instance, when the two rotatable members 4R and 4L are rotated at the same speed in opposite directions, the main wheel 2 does not rotate around the central axial line (B) while each free roller 25 is rotated around the central axial line (C) thereof. Thereby, the main wheel 2 is actuated in the direction of the central axial line (B) thereof or receives a lateral drive force, and is propelled in the lateral direction.

In this manner, by individually controlling the rotational speeds and rotational directions of the rotatable members 4R and 4L via the two electric motors 5R and 5L, the omni-directional vehicle 1 can be propelled on the road surface in any desired direction.

When the free rollers 25 of the main wheel 2 are rotated around the respective central axial lines (C) by appropriately driving the electric motors 5R and 5L while the auxiliary wheel 35 is caused to engage the road surface, as the auxiliary wheel 35 produces a lateral side force (in the direction of the central axial line (B) of the main wheel 2), and restricts the movement thereof, the main wheel 2 receives a yaw moment around a vertical yaw axis, and the lower vehicle body 7 (of the omni-directional vehicle 1) is caused to turn around this yaw axis. In other words, by producing a frictional force at an angle to the line connecting the ground contact point of the main wheel 2 and the ground contact point of the auxiliary wheel 35, a yaw moment around the yaw axis can be created. Thereby, the omni-directional vehicle 1 is enabled to make a turn with a relatively small turning radius.

The wedge shaped gaps defined between the free rollers 25 are filled by the gap members 53 so that the outer profile of the main wheel 2 centering around the central axial line (B) is free from or substantially free from irregularities. Therefore, vibrations and noises that are generated as the main wheel 2 rotates around the central axial line (B) and the omni-directional vehicle 1 travels over the road surface can be minimized.

The wedge shaped gaps defined between the free rollers 25 are filled with the gap members 53, and foreign matters such as gravel are prevented from being trapped between the free rollers 25 so that the free rollers 25 are allowed to freely rotate around the respective central axial lines (C) thereof without being hindered by foreign matters, and the omni-directional vehicle 1 is allowed to turn as designed.

Each gap member 53 preferably contacts the adjoining free rollers 25 via contact surfaces that involve a low frictional resistance. In the illustrated embodiment, each gap member 53 is fitted on the annular member 22 via a circular bore 53A so that the gap member 53 is allowed to rotate with the adjoining free rollers 25 to a certain extent. If each gap member 25 is made of material such as foamed material that is capable of compressive deformation in the thickness-wise direction, the gap member 25 may even be able to rotate around the central axial line (C) thereof by 360 degrees. This helps the omni-directional vehicle 1 to make a turn as designed when the gap member 53 engages the road surface.

Figure 5:
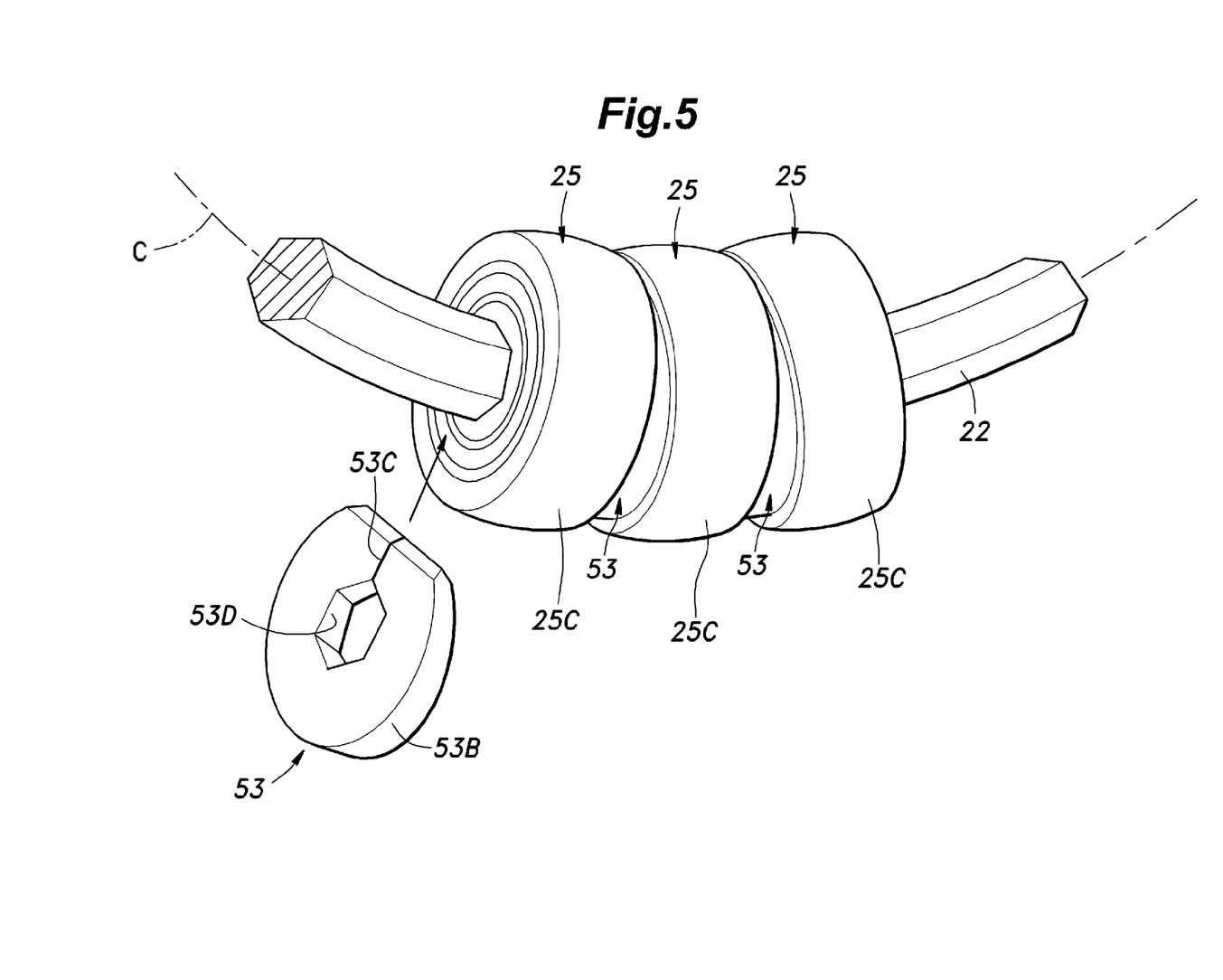
FIG. 5 is an enlarged fragmentary perspective view of the main wheel of another embodiment.

Alternatively, as shown in FIG. 5, the gap member 53 may be provided with a hexagonal bore 53 that fits on the annular member 22 having a hexagonal cross section so that the gap member 53 may be held rotationally fast by the annular member 22.

In this case, the gap member 53 is prevented from rotating with the adjoining free rollers 25, and remains immobile with respect to the free rollers 25. When the gap members 53 are prevented from rotating around the respective axial center lines (C), the outer diameter of the outer circumferential surface 53B of each gap member 53 may be smaller than that of the free rollers 25 (by an extent that does not essentially compromise the function of the gap member 53 to prevent the intrusion of foreign matters) so that the gap member 53 does not engage the road surface.

Figure 6:
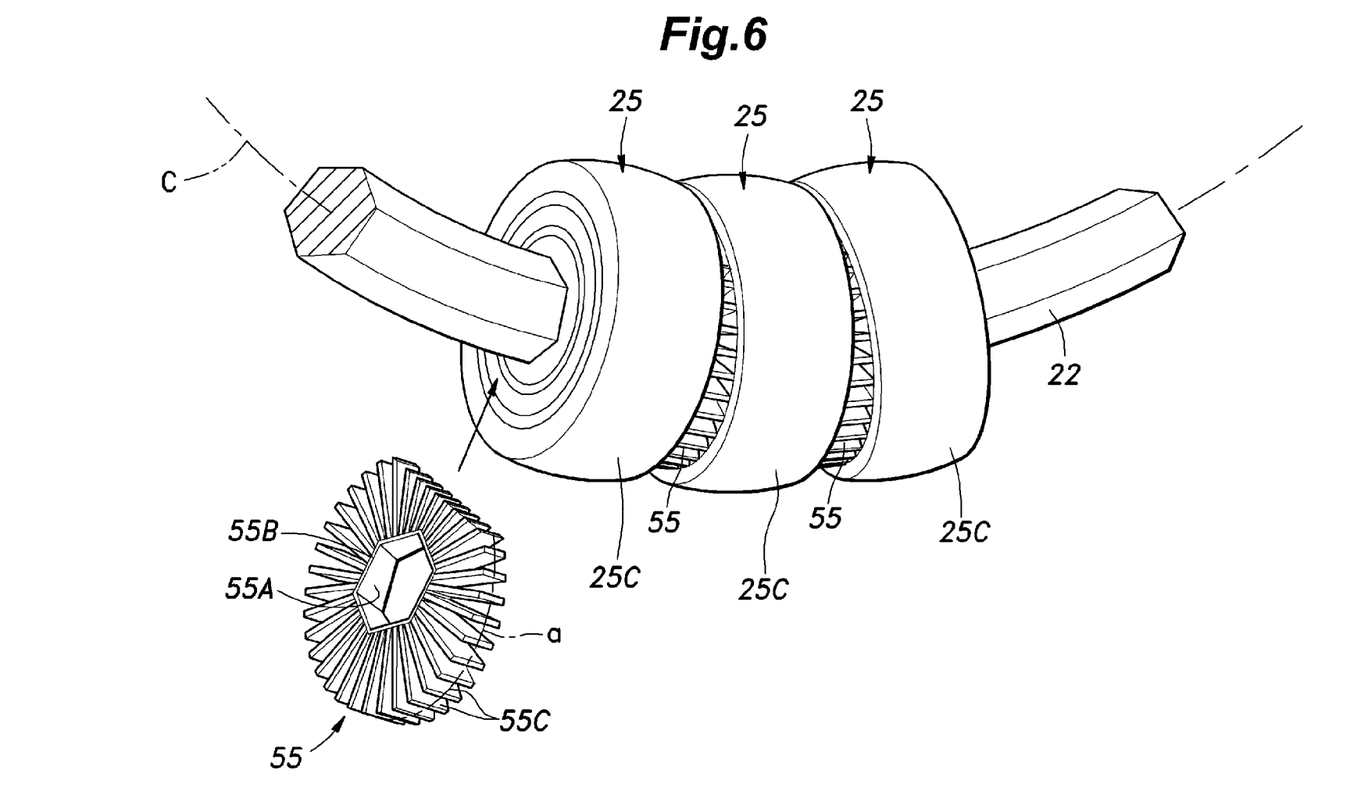
FIG. 6 is an enlarged fragmentary perspective view of the main wheel of yet another embodiment.

FIG. 6 shows yet another embodiment of the gap member 55. The gap member 55 of this embodiment comprises a hexagonal annular member 55B made of metallic or plastic material having a hexagonal bore 55A fitted onto the annular member 22 having a hexagonal cross section and a plurality of vane members 55C extending radially from the annular member 55B like bristles of a brush. Each vane member 55C is made of metallic plate, plastic plate or fiber material, and is highly stiff against a laterally applied force (in the direction of the movement of the free rollers 25 around the central axial line of the main wheel 2) but is capable of resiliently deforming against a small thickness-wise force (in the direction of the rotation of the free rollers 25 around the respective central axial lines).

The gap member 55 is fitted onto the annular member 22 by the hexagonal bore 55 in a rotationally fast manner, and is thereby fixedly supported by the annular member 22. The vane members 55C extend from the annular member 22 in radial direction centered at the central axial line of the gap member 22. The envelope circular line (a) defined by the tips of the vane members 55C is coaxial with the outer circumferential surface 25C of the free roller 25, and has an outer diameter which is the same as or slightly smaller than that of the free roller 25.

The wedge shaped gaps defined between the adjacent free rollers 25 are filled by the vane members 55C of the gap members 55 that demonstrate a high stiffness in the lateral direction (direction of the cross sectional center line (C)). The vane members 55C reduce or remove the irregularities in the outer profile of the main wheel 2, and this minimizes vibrations and noises that are generated as the main wheel 2 rotates around the central axial line (B) and the omni-directional vehicle 1 travels over the road surface.

As the gaps between the adjacent vane members 55C are narrow, foreign matters are prevented from being trapped in the gaps between the adjacent vane members 55C. Therefore, the rotation of each free roller 25 around the central axial line (C) thereof is not impeded by the trapping of any foreign matters in the gaps between the adjacent vane member 55C, and the omni-directional vehicle 1 is enabled to make a turn as designed without fail.

As the gap members 55 engage the free rollers 25 only at the lateral edges of the vane members 55C, the free rollers 25 do not encounter any substantial frictional resistance as they rotate around their respective axial center lines. When the free rollers 25 rotate while the gap members 55 engage the road surface, as the vane members 55C are configured to resiliently bend under a relatively small force directed in the thickness-wise direction of the vane members 55C, the vane members 55C undergo resilient bending deformation. Thereby, the gap members 55 engaging the road surface do not substantially prevent the omni-directional vehicle 1 from making a turn as designed.

Figure 7:
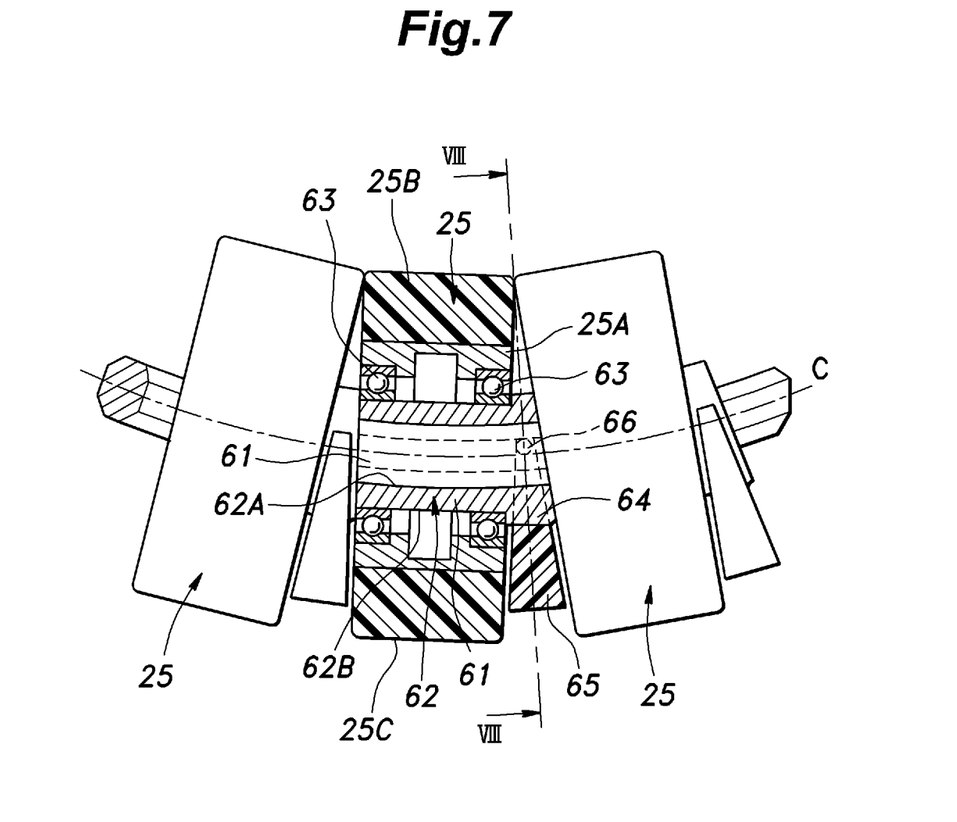
FIG. 7 is an enlarged fragmentary perspective view of the main wheel of yet another embodiment.
Figure 8:
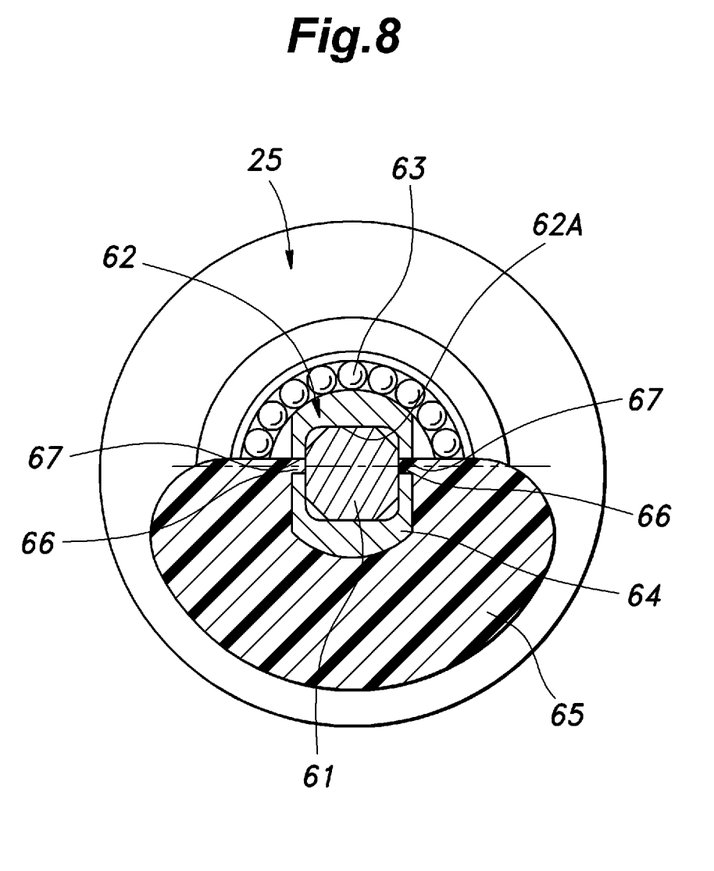
FIG. 8 is a sectional view taken along line VIII-VIII of FIG. 7.

Another embodiment of the main wheel of the present invention is described in the following with reference to FIGS. 7 and 8.

In this embodiment, an annular member 61 having an octagonal cross section is used for the main wheel 2. A plurality of flanged inner sleeves 62 each having a central bore 62A curved at a same curvature as the annular member 61 are fitted onto the annular member 61 so as to be rotatively and circumferentially immobile relative to the annular member 61.

Each free roller 25 is similar to that of the previous embodiment, and comprises a metallic cylindrical sleeve 25A and a cylindrical outer peripheral member 25B fixedly fitted on the sleeve 25A and defining an outer circumferential surface 25C of the free roller 25. The inner circumferential surface of each free roller 25 is rotatably fitted on the outer circumferential surface 23B of the cylindrical main part of the corresponding flanged inner sleeve 62 via a ball bearing 63.

The flanged inner sleeves 62 are provided so as to individually correspond to the particular free rollers 25, and are arranged continuously along the circumference of the annular member 61. A radial flange 64 is provided in an axial end (circumferential direction of the annular member 61) of each inner sleeve 62, and serves as a standoff member or a spacer member that determines the gap between the adjacent free rollers. In other words, each flange 64 is located in the wedge shaped gap defined between the adjacent free rollers 25. The radial flange 64 is linearly cut off at diametrically opposing parts thereof as shown in FIG. 8.

To each radial flange 64 is secured a gap member 65 that straddles on the radial flange 64 from the radially outer part of the main wheel 2. The gap member 65 is wedge shaped so that the wedge shaped gap between the adjacent free rollers 25 is filled as seen in FIG. 7 (or as seen from side). The gap member 65 is provided with a pair of bifurcated parts that interpose the radial flange 64 from the linearly cut off sides as seen in FIG. 8 (or as seen from front). Each bifurcated part of the gap member 65 is provided with a projection 66 that fits into a recess 67 formed in the corresponding cut off part of the radial flange 64 so that the gap member 65 is positively retained by the radial flange 64.

The gap member 65 may be made of plastic material such as ABS resin or rubber-like elastomer material so that each projection 66 may be engaged by and disengaged from the recess 67 of the radial flange 64 by means of the resilient deformation of the gap member 65. This simplifies the attachment and detachment of the gap member 65 to and from the radial flange 64.

In this embodiment also, the gap member 65 fills the gap between the adjacent free rollers 25, and prevents any foreign matter from being trapped in the gap.

Figure 9:
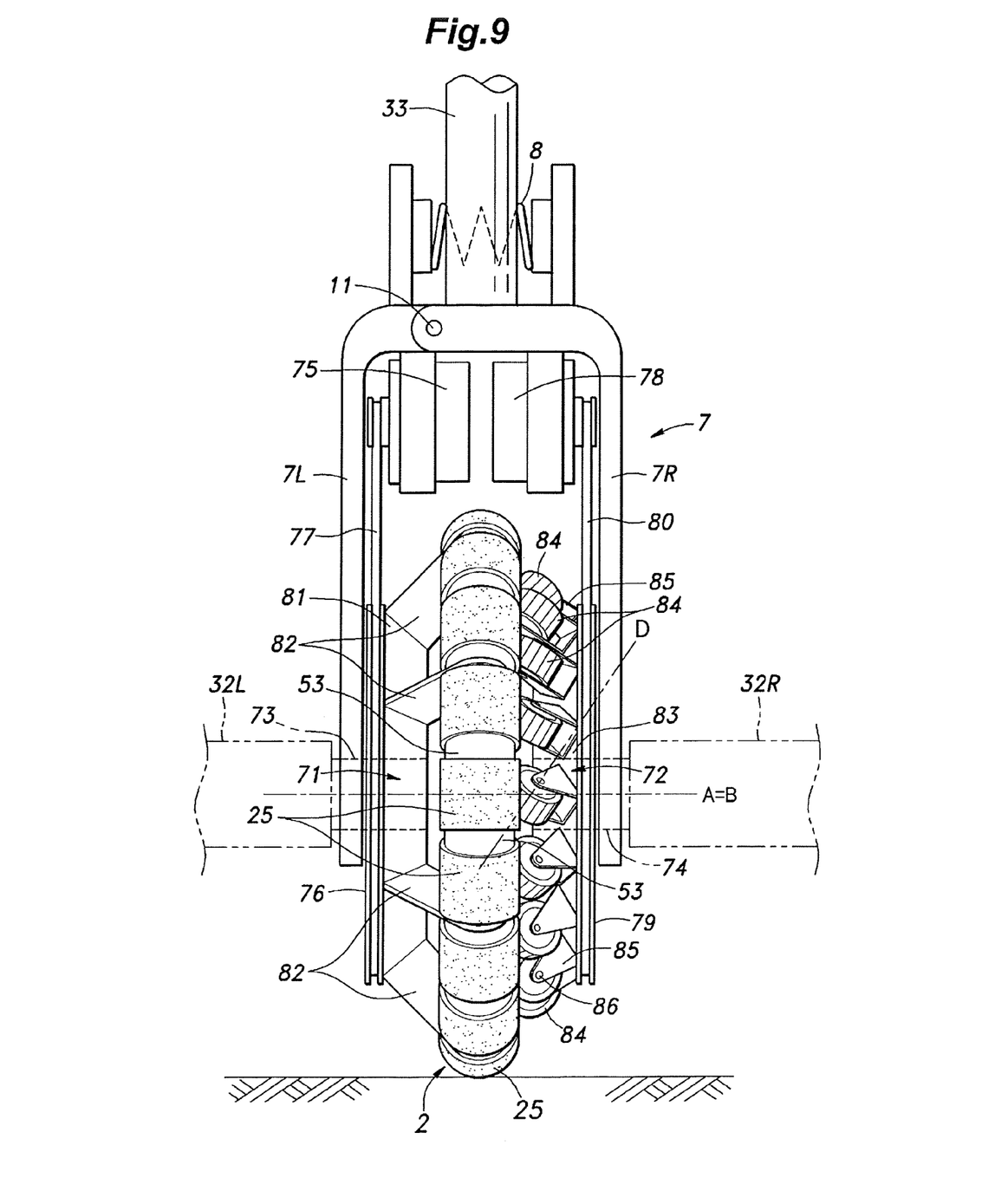
FIG. 9 is an enlarged fragmentary front view of a friction drive device and an omni-directional vehicle using the same given as a second embodiment of the present invention.

A second embodiment of the main wheel, the friction drive device and the omni-directional vehicle using the same of the present invention is described in the following with reference to FIG. 9. In FIG. 9, the parts corresponding to those in FIG. 2 are denoted with like numerals without repeating the description of such parts.

In this embodiment, the lower vehicle body 7 is provided with a pair of leg members 7L and 7R which rotatably support frusto-conical rotatable members 71 and 72 via support shafts 73 and 74, respectably, in a coaxial relationship to a common central axial line (A).

The left leg member 7L of the lower vehicle body 7 is provided with an electric motor 75. The left rotatable member 71 is integrally and coaxially provided with a pulley (or a sprocket) 76. The electric motor 75 is drivingly coupled with the pulley 76 via an endless belt (or a link chain) 77 so that the rotatable member 71 can be rotatively actuated around the central axial line (A) of the support shaft 73.

The right leg member 7R of the lower vehicle body 7 is provided with another electric motor 78. The right rotatable member 72 is integrally and coaxially provided with a pulley (or a sprocket) 79. The electric motor 78 is drivingly coupled with the pulley 79 via an endless belt (or a link chain) 80 so that the rotatable member 72 can be rotatively actuated around the central axial line (A) of the support shaft 74.

A plurality of arms 82 extend from the tapered outer circumferential surface 81 of the rotatable member 71 toward the other rotatable member 72 (to the right as seen in FIG. 9), and a main wheel 2 including an annular member 22 and free rollers 25 similar to the main wheel of the previous embodiment is fixedly supported by the free ends of the arms 82 at the annular member 22 thereof. Therefore, the main wheel 2 is rotatably supported by the lower vehicle body 7 around the central axial line (A) jointly with the rotatable member 71. In other words, the lower vehicle body 7 supports the main wheel 2 via the rotatable member 71 so as to be rotatable around the central axial line (A).

A plurality of drive rollers 84 are mounted on the tapered outer circumferential surface 83 of the other rotatable member 72 at a regular interval along the circumference of the rotatable member 72 each via a bracket 85 and a pivot pin 86 in a freely rotatable manner.

The outer circumferential surface of each drive roller 84 engages the outer circumferential surface of the corresponding free roller 25 under the biasing force of the compression coil spring 8 that resiliently urges the right and left leg members 7R and 7L toward each other, and torque is frictionally transmitted from the drive rollers 84 to the free rollers 25. Each drive roller 84 is freely rotatable around a central axial line (D) thereof which is in a skewed relationship to the central axial line (C) of the corresponding free roller 25. Therefore, the rotational center line of each drive roller 84 is in a skewed relationship to the rotational center line of the free roller 25 with which the particular drive roller 84 engages.

When seen in a projected plane perpendicular to the central axial line (A), the central axial line of each drive roller 84 tilts by a certain angle with respect to the central axial line of the corresponding free roller 25. The central axial line of each drive roller 84 tilts with respect to the radial line of the annular member 22 corresponding to the center of the corresponding free roller 25, and, at the same time, tilts with respect to an imaginary plane tangential to the cross sectional central line of the annular member 22. This three dimensional tilting of the two axial lines is similar to the tilting of the teeth of a pair of helical conical gears meshing with each other.

Owing to this geometrical relationship, as the right and left rotatable members 71 and 72 are rotated relative to each other, each free roller 25 receives a frictional force (side force) including a force component directed tangentially around the rotational center line of the free roller 25 and a force component directed in the axial center line (or along the generatrix line) of the free roller 25 from the corresponding drive roller 84 at the point of contact between the two rollers.

Therefore, when the rotatable members 75 and 78 rotate in the same direction at the same rotational speed powered by the corresponding electric motors 75 and 78, the drive rollers 84 turn around the central axial line (A) of the rotatable members 75 and 78 without each drive roller 84 rotating around the central axial line thereof, and the resulting side force of each drive roller 64 acts upon the corresponding free roller 25 along the axial center line thereof. As a result, the main wheel 2 rotatively actuated by the rotatable member 71 around the central axial line (B) thereof without the free rollers 25 rotating around the respective central axial lines thereof.

If the rotatable members 71 and 72 are made to rotate in opposite directions and/or at different speeds powered by the corresponding electric motors 75 and 78, the drive rollers 84 turn around the central axial line (A) of the rotatable member 72 while each drive roller 84 rotates around the central axial line thereof so that the resulting side force of each drive roller 84 includes a component that actuates each free roller 25 of the main wheel 2 along the outer circumference of the free roller 25 or around the axial center line thereof. Thereby, the free roller 25 rotates around the cross sectional center line (C) or tangential line of the main wheel 2.

In this manner, by individually controlling the rotational speeds and rotational directions of the rotatable members 71 and 72 via the two electric motors 75 and 78, the omnidirectional vehicle 1 can be propelled on the road surface in any desired direction.

In this embodiment also, the number of the drive rollers 84 and the number of the free rollers 25 are selected in such a manner that the free roller 25 engaging the floor surface or road surface is engaged by at least one of the drive rollers 84, and thereby receives a drive force at all times.

As the main wheel 2 of this embodiment is essentially not different from the main wheel of the previous embodiment, this embodiment provides the advantages of preventing gravel and other foreign matters from being trapped between the free rollers 25, and minimizing the traveling vibrations and noises similarly as the previous embodiment.

GLOSSARY 1 omni-directional vehicle
2 main wheel
3R right drive roller
3L left drive roller
4L, 4R rotatable member
7 lower vehicle body
22 annular member
25 free roller
53, 55 gap member
62 flanged inner sleeve
64 radial flange
65 gap member
71, 72 rotatable member
84 drive roller

The invention claimed is:

1. A wheel including an annular member and a plurality of free rollers each rotatably supported by the annular member around a corresponding tangential line of the annular member,
  wherein a gap member is placed between an adjacent pair of the free rollers to fill a gap defined between the free rollers, and
  wherein the gap member includes an annular mount member fitted onto the annular member and a plurality of vane members extending radially from the annular mount member, the vane members being arranged on an outer circumferential surface of the annular mount member in a circumferential direction of the annular mount member.

2. A wheel including an annular member and a plurality of free rollers each rotatably supported by the annular member around a corresponding tangential line of the annular member,
  wherein a gap member is placed between an adjacent pair of the free rollers to fill a gap defined between the free rollers, and
  wherein a plurality of flanged inner sleeves are fitted on the annular member in a rotationally fast manner so that a radial flange provided on each flanged inner sleeve is interposed between an adjacent pair of free rollers, each gap member being mounted on the corresponding radial flange, and
  wherein each free roller is rotatably fitted on an outer circumferential surface of a cylindrical main part of a corresponding flanged inner sleeve.

3. A friction drive device, comprising:
  a wheel as defined in claim 1;
  a pair of rotatable members rotatably supported on either side of the wheel around a central axial line of the annular member; and
  a plurality of drive rollers arranged on each rotatable member along a circle concentric to a rotational center of the rotatable member such that each drive roller is rotatable around a rotational center line in a skewed relationship to the rotational center line of the rotatable member, and engages an outer circumferential surface of the corresponding free roller.

4. A friction drive device, comprising:
  a wheel as defined in claim 1;
  a wheel supporting rotatable member rotatably supported on one side of the wheel around a central axial line of the annular member and supporting the annular member of the wheel;
  a rotatable member rotatably supported on another side of the wheel around the central axial line of the annular member; and
  a plurality of drive rollers arranged on each rotatable member along a circle concentric to a rotational center of the rotatable member such that each drive roller is rotatable around a rotational center line in a skewed relationship to the rotational center line of the rotatable member, and engages an outer circumferential surface of the corresponding free roller.

5. An omni-directional vehicle including the friction drive device according to claim 3, wherein the vehicle is configured to travel by the wheel.

6. A friction drive device, comprising:
  a wheel as defined in claim 2;
  a pair of rotatable members rotatably supported on either side of the wheel around a central axial line of the annular member; and
  a plurality of drive rollers arranged on each rotatable member along a circle concentric to a rotational center of the rotatable member such that each drive roller is rotatable around a rotational center line in a skewed relationship to the rotational centerline of the rotatable member, and engages an outer circumferential surface of the corresponding free roller.

7. A friction drive device, comprising:
  a wheel as defined in claim 2;
  a wheel supporting rotatable member rotatably supported on one side of the wheel around a central axial line of the annular member and supporting the annular member of the wheel;
  a rotatable member rotatably supported on another side of the wheel around the central axial line of the annular member; and
  a plurality of drive rollers arranged on each rotatable member along a circle concentric to a rotational center of the rotatable member such that each drive roller is rotatable around a rotational center line in a skewed relationship to the rotational center line of the rotatable member, and engages an outer circumferential surface of the corresponding free roller.

8. A friction drive device, comprising:
a wheel as defined in claim 1, wherein the plurality of vane members of the gap member are disposed substantially perpendicular to side surfaces of the adjacent pair of the free rollers.

* * * * *